United States Patent
Havala et al.

(10) Patent No.: US 7,430,210 B2
(45) Date of Patent: *Sep. 30, 2008

(54) APPLICATION OF AN ETHERNET/MPLS "HALF BRIDGE" TO PROVIDE EMULATED ETHERNET LAN FUNCTIONS IN SONET NETWORKS

(75) Inventors: Paul F. Havala, Richardson, TX (US); Samuel Y. Lisle, Fairview, TX (US); Biaodong Cai, San Ramon, CA (US); Floyd D. Ferguson, Irving, TX (US)

(73) Assignee: Fujitsu Limited, Kawasaki (JP)

( * ) Notice: Subject to any disclaimer, the term of this patent is extended or adjusted under 35 U.S.C. 154(b) by 724 days.

This patent is subject to a terminal disclaimer.

(21) Appl. No.: 10/856,408

(22) Filed: May 26, 2004

(65) Prior Publication Data

US 2005/0265355 A1    Dec. 1, 2005

(51) Int. Cl.
    H04L 12/28    (2006.01)
    H04J 3/16    (2006.01)
(52) U.S. Cl. .................. 370/395.53; 370/466
(58) Field of Classification Search ............ 370/389, 370/395.5, 395.51, 395.53, 400, 401, 466
    See application file for complete search history.

(56) References Cited

U.S. PATENT DOCUMENTS

| | | | |
|---|---|---|---|
| 6,339,595 B1 | 1/2002 | Rekhter et al. | |
| 6,633,571 B1 | 10/2003 | Sakamoto et al. | |
| 6,757,298 B1 | 6/2004 | Burns et al. | |
| 6,771,662 B1 | 8/2004 | Miki et al. | |
| 6,788,681 B1 | 9/2004 | Hurren et al. | |
| 6,985,488 B2 * | 1/2006 | Pan et al. ............... | 370/395.3 |
| 7,079,544 B2 * | 7/2006 | Wakayama et al. ......... | 370/401 |
| 7,242,665 B2 | 7/2007 | Langille et al. | |
| 2002/0110087 A1 | 8/2002 | Zelig et al. | |
| 2002/0176450 A1 * | 11/2002 | Kong et al. ............... | 370/539 |
| 2003/0110268 A1 | 6/2003 | Kermarec | |
| 2003/0174706 A1 | 9/2003 | Shankar et al. ............ | 370/393 |
| 2003/0185223 A1 * | 10/2003 | Tate et al. ............... | 370/410 |
| 2004/0037279 A1 * | 2/2004 | Zelig et al. ............... | 370/390 |
| 2004/0076166 A1 * | 4/2004 | Patenaude ............... | 370/401 |
| 2004/0081172 A1 | 4/2004 | Ould-Brahim ........ | 370/395.53 |
| 2004/0146058 A1 * | 7/2004 | Nemoto et al. ............ | 370/401 |
| 2004/0170173 A1 * | 9/2004 | Pan et al. ............... | 370/392 |
| 2004/0174887 A1 | 9/2004 | Lee .................... | 370/395.53 |
| 2005/0053079 A1 | 3/2005 | Havala et al. | |

(Continued)

OTHER PUBLICATIONS

Paul F. Havala et al., U.S. Appl. No. 10/856,586, entitled Application of an Ethernet/MPLS Half Bridge to Provide Ethernet Multiplexing Functions (EMF) in Sonet Network Elements (NEs), May 28, 2004.

(Continued)

Primary Examiner—Hong Sol Cho
(74) Attorney, Agent, or Firm—Baker Botts L.L.P.

(57) ABSTRACT

A system and method for providing emulated Ethernet LAN functions in a SONET network are provided. In one embodiment, a virtual private network includes a core network. The core network includes a shared label switching over SONET network. A plurality of Virtual Local Access Networks (VLANs) are each coupled to a Multiservice Provision Platform (MSPP) of the SONET network. Each VLANs communicates traffic with a corresponding MSPP utilizing Ethernet. The MSPPs interface the VLANs with the SONET network.

16 Claims, 13 Drawing Sheets

U.S. PATENT DOCUMENTS

2005/0265329 A1  12/2005  Havala et al.
2005/0265355 A1  12/2005  Havala et al.

OTHER PUBLICATIONS

Lee et al., "End to End QoS Architecture for VPNs: MPLS VPN Development in a Backbone Network,", Electronics and Telecommunications Research Institute, IEEE 2000, pp. 479-483.

European Search Report in European Patent Application No. EP 04 02 0905, Jan. 4, 2005, 2 pages.

Jamieson et al., "MPLS VPN Architecture," Nortel Telecom Ltd., Aug. 7, 1998, 16 pages.

Rosen et al., "BGP/MPLS VPN's," Cisco Systems, Inc., Mar. 1999, 25 pages.

Vivace Networks, "Delivering Ethernet Traffic in MAN/WAN, Practical Ways to Offer Managed Ethernet Services," 2001, pp. 1-19.

Hama et al., U.S. Appl. No. 09/805,868, "Network and Edge Router," filed Mar. 14, 2001, 51 pages, 25 drawings.

* cited by examiner

| VLAN ID (VID) | VPN LABEL |
|---|---|
| N | M |
| N+1 | M+1 |
| ⋮ | ⋮ |
| N' | M' |

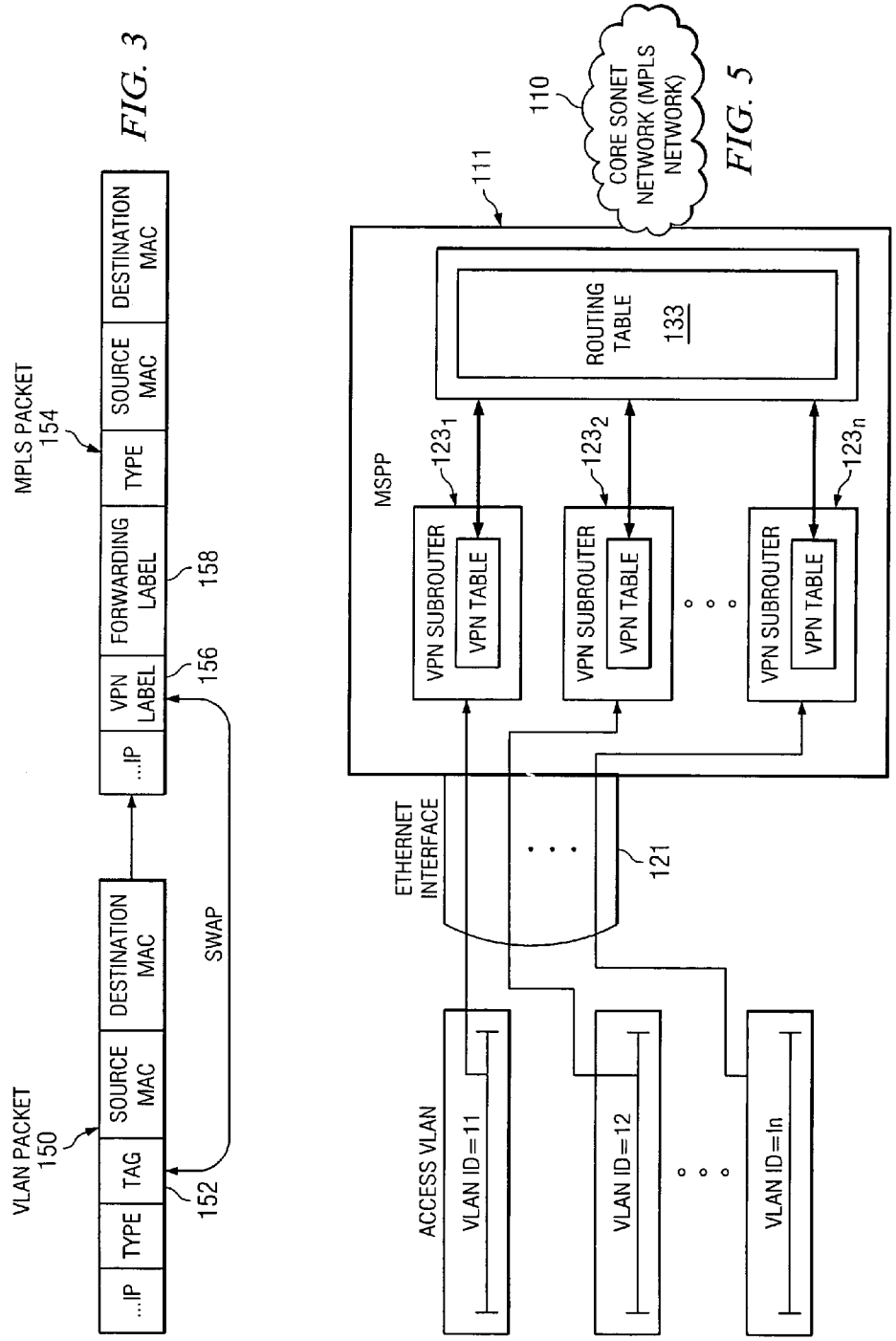

FIG. 10A (a) L2 VPN LABEL TABLE OF MSPP A  124

| PE A #VPN IDENTIFIER | | | LABEL TABLE OF ENTERPRISE A | |
|---|---|---|---|---|
| VPN LABEL | L2 ADDRESS | OUTGOING I/F | VLAN ID (VID) | VPNi |
| 26 | | | 101 | COMPANY-A |

VLAN ID AND VPN IDENTIFIER ENTERED STATICALLY WHEN VPN/VLAN IS SET UP (b) L2 VPN ROUTING TABLE OF MSPP A

| PE A #VPN IDENTIFIER | ROUTING TABLE OF ENTERPRISE A |
|---|---|
| | |
| | |
| | |

125

FIG. 10B (a) L2 VPN LABEL TABLE OF MSPP A  124

| PE A #VPN IDENTIFIER | | | LABEL TABLE OF ENTERPRISE A | |
|---|---|---|---|---|
| VPN LABEL | L2 ADDRESS | OUTGOING I/F | VLAN ID (VID) | VPNi |
| 26 | MACA | ETHERNET 0 | 101 | COMPANY-A |

(b) L2 VPN ROUTING TABLE OF MSPP A

| PE A #VPN IDENTIFIER   ROUTING TABLE OF ENTERPRISE A |
|---|
| LOOPBACK ADDRESS OF L2 MAC B VIA PE B; VLAN 152 |
| LOOPBACK ADDRESS OF L2 MAC C VIA PE C; VLAN 1501 |
| L2 MAC A IS DIRECTLY CONNECTED, ETHERNET0, VLAN 101 |

SET UP BY ROUTING PROTOCOL

DIRECT CONNECT BECAUSE CPE IS DIRECTLY CONNECTED TO OWN MSPP

125

VPN TABLE OF ENTERPRISE A IN MSPP A

| L2 VPN LABEL TABLE OF ENTERPRISE A | | | | |
|---|---|---|---|---|
| VPN LABEL | OUTGOING I/F | MAC | VID | VPNi |
| 26 | ETHERNET | MAC A | 101 | COMPANY A |
| L2 VPN ROUTING TABLE OF ENTERPRISE A | | | | |
| L2 | MAC B | LOOPBACK ADDRESS OF MSPP B; VLAN 152 | | |
| L2 | MAC C | LOOPBACK ADDRESS OF MSPP C; VLAN 1501 | | |
| L2 | MAC A | DIRECTLY CONNECTED, ETHERNET, VLAN 101 | | |

*FIG. 11A*

VPN TABLE OF ENTERPRISE A IN MSPP B

| L2 VPN LABEL TABLE OF ENTERPRISE A | | | | |
|---|---|---|---|---|
| VPN LABEL | OUTGOING I/F | MAC | VID | VPNi |
| 26 | EHTERNET | MAC B | 152 | COMPANY A |
| L2 VPN TABLE OF ENTERPRISE A | | | | |
| L2 | MAC B | DIRECTLY CONNECTED, ETHERNET, VLAN 152 | | |
| L2 | MAC C | LOOPBACK ADDRESS OF MSPP C; VLAN 1501 | | |
| L2 | MAC A | LOOPBACK ADDRESS OF MSPP A; VLAN 101 | | |

*FIG. 11B*

VPN TABLE OF ENTERPRISE A IN MSPP C

| L2 VPN LABEL TABLE OF ENTERPRISE A | | | | |
|---|---|---|---|---|
| VPN LABEL | OUTGOING I/F | MAC | VID | VPNi |
| 26 | ETHERNET | MAC C | 1501 | COMPANY A |
| L2 VPN LABEL TABLE OF ENTERPRISE A | | | | |
| L2 | MAC B | LOOPBACK ADDRESS OF MSPP B; VLAN 152 | | |
| L2 | MAC C | DIRECTLY CONNECTED, ETHERNET, VLAN 1501 | | |
| L2 | MAC A | LOOPBACK ADDRESS OF MSPP A; VLAN 101 | | |

*FIG. 11C*

APPLICATION OF AN ETHERNET/MPLS "HALF BRIDGE" TO PROVIDE EMULATED ETHERNET LAN FUNCTIONS IN SONET NETWORKS

TECHNICAL FIELD

The present invention relates generally to communication networks, and more particularly to an application of an Ethernet/MPLS "half bridge" to provide emulated Ethernet LAN functions in SONET networks.

BACKGROUND

Virtual Private Networks (VPNs) are used to interconnect geographically remote offices, campuses, factories, research labs and other factories of an Enterprise Across a shared network. This shared network may be a wide-area network (WAN) such as the Internet. The VPN may include a Multiservice Provisioning Platforms (MSPPs), a WAN router and a VPN-dedicated device at each geographic site. VPNs may utilize a Virtual Local Area Network (VLAN), a multiprotocol label switching (MPLS) over SONET network or other network.

VLANs group network—connected devices without relation to their physical wiring and constructions. The sending and receiving of frames is performed within the same group and the broadcasting of frames also takes place within the same group. Communication with a different VLAN group generally uses the intermediary of a router.

MPLS provides a virtual communication path in an Internet Protocol (IP WAN), which may include a SONET network. In particular, MPLS adds a label onto an IP packet that identifies a connection. The network router transmits the IP packet by popping, pushing or swapping the value of the label. In this way, an IP connection-type service is provided. However, the MPLS standards do not address integration of all aspects of MPLS switching into a SONET network.

SUMMARY

A system and method for providing emulated Ethernet LAN functions in a SONET network are provided. In one embodiment, a virtual private network includes a core network. The core network includes a shared label switching over SONET network. A plurality of Virtual Local Access Networks (VLANs) are each coupled to a Multiservice Provision Platform (MSPP) of the SONET network. Each VLAN communicates traffic with a corresponding MSPP utilizing Ethernet. The MSPPs interface the VLANs with the SONET network.

Technical advantages of one or more embodiments may include providing an MPLS/SONET network to emulate a LAN as compared to a switch/bridge. In this case the MPLS/SONET network passes complex bridging control protocols transparently, so this implementation dramatically reduces complexity and simplifies interoperability. The cost of ownership may be significantly lowered. Yet other technical advantages may include an ability to cross an arbitrary number of SONET rings and may provide efficient support of point-to-point, multipoint services. Still yet other technical advantages may be Quality of Service (QoS) options per customer port and/or VLAN.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

FIG. 3 illustrates one embodiment of conversion of a VLAN packet to a MPLS SONET packet in the network of FIG. 1;

FIG. 5 illustrates one embodiment of the Ethernet line card of FIG. 2;

FIGS. 10A-B illustrate one embodiment of the VPN tables of FIG. 9;

FIGS. 11A-C illustrate one embodiment of enterprise VPN tables for Enterprise A in the network of FIG. 6;

DETAILED DESCRIPTION OF THE DRAWINGS

Figures 1, 4:
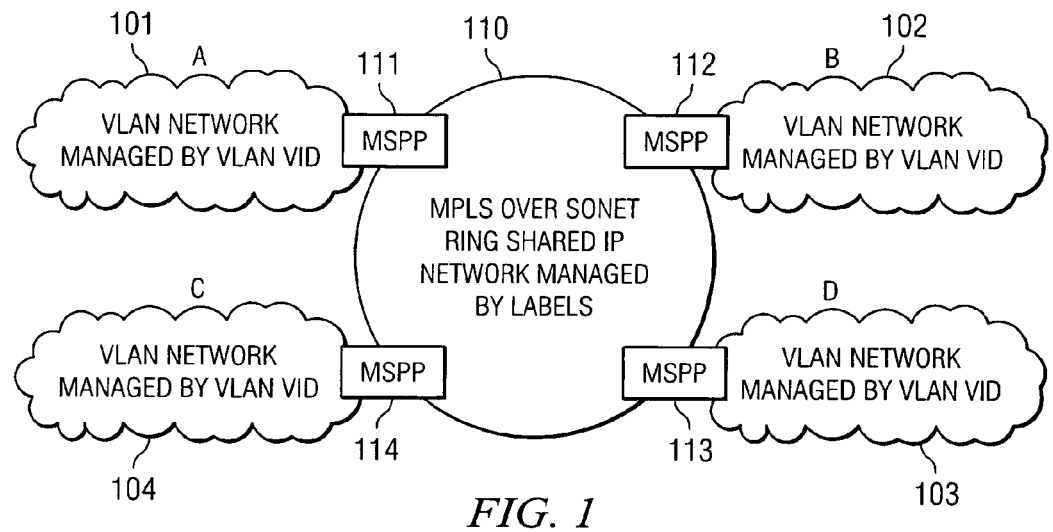
FIG. 1 illustrates one embodiment of virtual local area networks (VLANs) with access to a shared label switching over SONET network.
FIG. 4 illustrates one embodiment of the conversion table of the subrouter of FIG. 2.

FIG. 1 illustrates one embodiment of virtual local area networks (VLANs) with access to a shared label switching over SONET network to form a plurality of virtual private networks (VPNs) via channelized Ethernet over SONET (EoS). In this embodiment, the VPNs are Layer2 (L2) VPNs. Layer3 or other layer VPN could be used. In this embodiment, the shared label switching over SONET network is a multiprotocol label switching over SONET (MPLS/SONET) network. MPLS provides a path (a virtual communication path) into an IP network. It will be understood that the shared network may comprise other label switching networks, Internet Protocol (IP) networks or other suitable networks with tunneling or other functionality to support geographically distributed virtual private network (VPNs). For example, non-IP such as IPX, FNA, AppleTalk and the like may be implemented.

Referring to FIG. 1, a mixed network comprises VLANs 101-104 of sites A to D, respectively, and a shared MPLS/SONET network 110. Schemes for implementing a VLAN include (1) port-base VLAN, (2) MAC-address based VLAN and (3) policy-based VLAN. The MPLS/SONET network may comprise Label Switching Routing (LSRs). As described in more detail below, the VLANs 101-104 are managed by prescribed VLAN IDs (VIDs). The shared MPLS/

SONET network 110 is managed by labels and may be constructed on the Internet or other Wide Area Network (WAN) by MPLS/SONET. The edges of the MPLS network 110 are provided with Multiservice Provisioning Platforms (MSPPs) 111-114. MSPPs 111-114 may be any suitable device within or connected to the shared core network and operable to interface between a VLAN (or other suitable LAN) and the shared core network and to switch, route, direct, bridge, convert or otherwise process and/or send traffic. For example, MSPPs 111-114 may comprise Label Edge Routers (LERs). As used herein, send means to forward, allow or initiate forwarding or sending, transmitting or otherwise directing.

Each MSPP 111-114 converts ingress VLAN packets, which enter from the VLANs 101-104, to MPLS packets and transmits the MPLS packets over one or more SONET paths in the MPLS/SONET network 110. Each MSPP 111-114 is further operable to convert MPLS packets to egress VLAN packets and output the VLAN packets to prescribe VLANs.

In a particular embodiment, as described in more detail below, each MSPP 111-114 converts a VID contained in a VLAN packet to a VPN label, which is a VPN identifier, finds a forwarding label, if appropriate, for forwarding the packet along a prescribed route on the basis of the destination of the VLAN packet, and poses these labels, when appropriate, in place of the VID to generate an MPLS packet, and sends the MPLS packet to the MPLS/SONET network 110 by mapping the MPLS packet into one or more SONET paths. As used herein, find means to look-up, determine, retrieve or otherwise become aware of. The MPLS/SONET network 110 routes the MPLS packet to the target MSPP 111-114 over a preset route while the forwarding label of the packet, if included, is replaced. Upon receiving the MPLS packet from the MPLS/SONET network 110, a MSPP 111-114 receiving the packet converts the MPLS packet to an MPLS packet, removes any included forwarding label, converts the VPN label to the original VID (or to another VID), adds the VID to the packet in place of the label to generate a VLAN packet and sends the VLAN packet to the VLAN 101-114 indicated by the VID. In this way, a packet can be transmitted from a VLAN 101-104 transmitting a packet belonging to a certain VPN to a disparate VLAN 101-104 receiving the packet and belonging to the same VPN.

The VLANs 101-104 are each connected to MPLS/SONET network 110 by Ethernet interfaces. As used herein, each means every one of at least a subset of the identified items and SONET means Synchronous Optical Networks including Synchronous Signal Digital Hierarchy (SDH) networks. To support EoS, the network elements of each VLAN 101-104 and MPLS/SONET network 110 include MSPPs 111-114 which map Ethernet services over SONET.

For channelized EoS, a SONET path or a virtual concatenation of SONET paths provides a point-to-point tunnel. Traditional SONET paths include STS-1 (51.84 Mbps), STS-Nc (e.g., 622.08 Mbps for STS-12c) and VT1.5 (1.728 Mbps) paths. Virtual concatenation combines a number of SONET paths (e.g., 5 STS-3c, virtually concatenated into STS-3c-5v) to present a single payload to the EoS adaptation layer. Virtual concatenation provides additional bandwidth granularity for tunnels (i.e., at integer multiples of traditional SONET rates) in a manner that is transparent to the SONET network as virtual concatenation is visible only to SONET path terminating elements and the SONET network operates at the SONET section and line layers.

In the mixed network, edge network elements of the VLANs 101-104 and of the MPLS/SONET network 110 includes SONET interfaces that support physical layer channelization in which Synchronous Transport Signal (STS) or Virtual Tributary (VT) paths are multiplexed onto a single physical interface.

Figure 2:
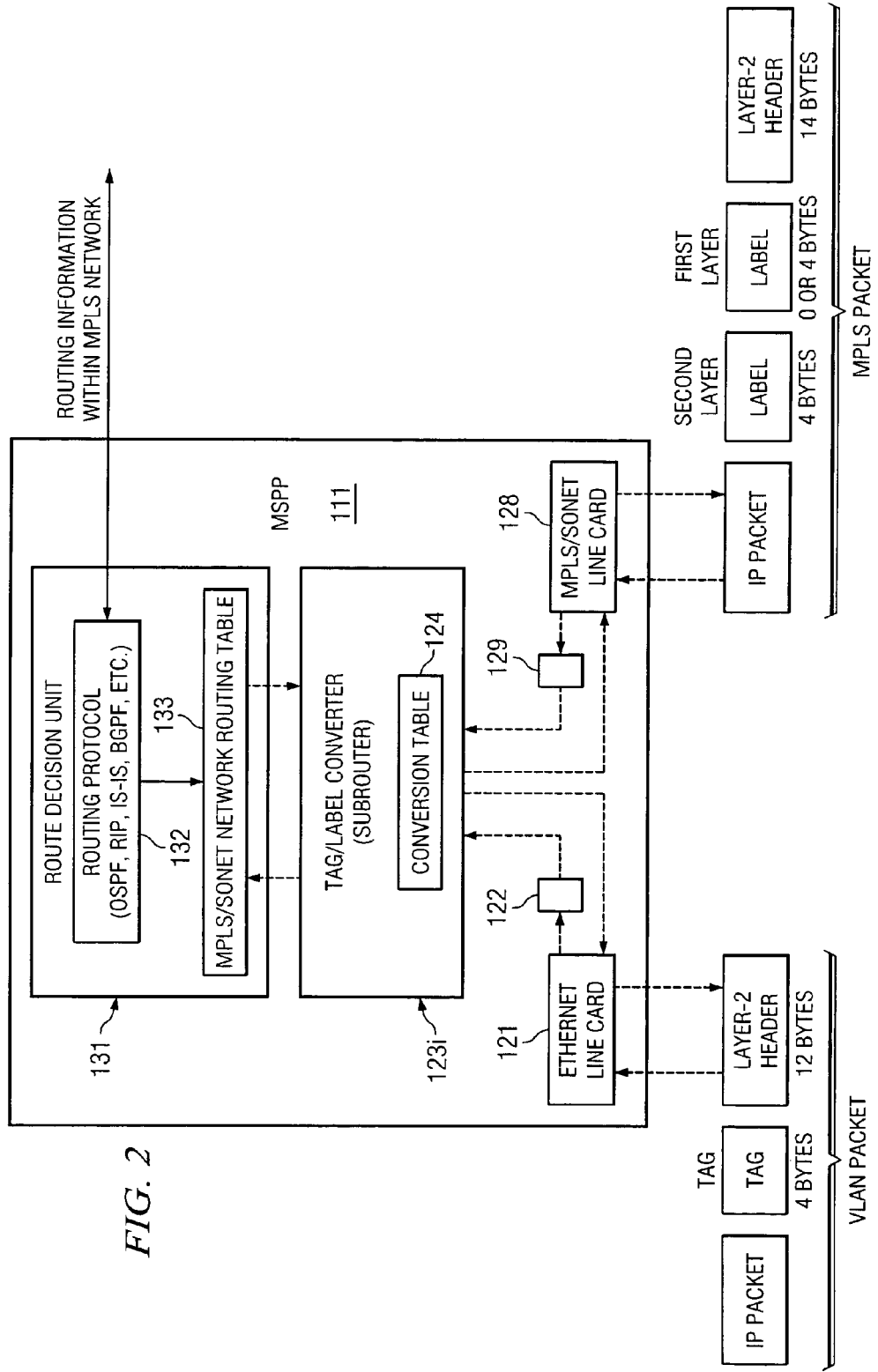
FIG. 2 illustrates one embodiment of a Multiservice Provisioning Platform (MSPP) of FIG. 1.

FIG. 2 illustrates one embodiment of MSPP 111 of FIG. 1. The other MSPPs may be identically or similarly constructed. MSPP 111 may be otherwise suitably constructed with disparate elements and/or with its functionality otherwise distributed or combined. The functionality of MSPP 111 and other components of the network may be performed by logic and encoded in media. The logic may be hardware or software based.

Referring to FIG. 2, MSPP 111 has one or more Ethernet line cards 121 equipped with an Ethernet interface function for receiving a VLAN packet from a certain VLAN. Each Ethernet line card 121 may be associated with a separate VPN identification unit 122. Alternatively, a single VPN identification unit 122 may be associated with the plurality or all of the Ethernet line cards 121 of the MSPP 111. The VPN identification unit 122 identifies, in one embodiment, a VPN by referring to the VID of the received VLAN packet and inputs the packet to a tag/label converter (subrouter) 123$i$($i$=1, 2, . . . ) that corresponds to the VPN. The subrouter 123$i$ corresponding to the identified VPN has a conversion table 124 which, in one embodiment, sorts the correspondence between (1) VLAN IDs (VIDs) and (2) VPN identifiers (VPN labels) that specify VPNs to which the VLANs specified by the VIDs belong. Details of the conversion table 124 are illustrated in FIG. 4.

MSPP 111 may further include a route decision unit 131 for deciding beforehand a route to a MSPP 111-114 receiving an MPLS packet using a routing protocol 132 and storing in a MPLS/SONET network routing table (forwarding-memory) 133 a forwarding label and an egress interface. The egress interface may include a SONET path and an outgoing interface. The forwarding label may comprise a null forwarding label or an IP forwarding label (a push label). The null forwarding label has 0 bytes and is included when the egress interface provides sufficient context for a corresponding VPN. In one embodiment, MSPP 111 comprises a half bridge. As used herein, a half bridge is any software, hardware, or firmware operable to only replicate data toward MPLS/SONET network 110, only learns Layer-2 address information from the MPLS/SONET network 110, and performs split horizon forwarding (i.e., does not forward data received from the MPLS/SONET network back to the MPLS/SONET network). In this embodiment, MPLS/SONET network 110 emulates Ethernet LAN function and thus does not participate in the Ethernet switch control plane, thereby passing Ethernet switch control traffic transparently. In so doing, MPLS/SONET network 110 eliminates redundant bridging functions.

Each MPLS/SONET line card 128 is coupled to tag/label converter 123$i$ and MPLS/SONET network 110. MPLS/SONET line card 128 is operable to receive an MPLS packet from tag/label converter 123$i$ and communicate an MPLS packet to MPLS network 110. The received MPLS packet is mapped into one or more SONET paths. Line card 128 may be any software, hardware, or firmware operable to map an MPLS packet into one or more SONET paths, using methods that include, but are not limited to, SONET virtual concatenation.

FIG. 3 illustrates one embodiment of conversion of a VLAN packet to an MPLS packet. As used in herein, conversion means to swap, translate, transition or otherwise modify addressing information in a packet. In this embodiment, the tag of a VLAN packet is swapped for a VPN label and a forwarding label to generate the MPLS packet. The VLAN packet may be otherwise suitably converted to an MPLS or other label switching packet.

Referring to FIG. 3, when a VLAN packet 150 enters, the subrouter 123i refers to conversion table 124 to find the VPN identifier (VPN label) 156 corresponding to the VID contained in tag 152. Subrouter 123i further finds the receiving MSPP 111-114 based upon the destination address contain in the VLAN packet 150 and finds, if appropriate, forwarding label 158, which has been stored in correspondence with the IP address of MSPP 111-114, from the MPLS network routing table 133.

If the label is found, subrouter 123i inserts, swaps, or replaces VPN label 156 and forwarding label 158 in place of tag 152 of VLAN packet 150 to generate MPLS packet 154 and sends MPLS packet 154 to MPLS network 110 via MPLS/SONET line card 128. MPLS/SONET line card 128 may be equipped with an MPLS over SONET interface function for receiving a MPLS packet from route decision unit 131 and mapping the received MPLS packet into one or more SONET paths. MPLS/SONET network 110 routes MPLS packet 154 to the target MSPP 111-114 over the preset route while replacing, where appropriate, forwarding label 158. MPLS/SONET line card 128 of the receiving MSPP 111-114 receives an MPLS packet 154 from MPLS/SONET network 110 and converts the received MPLS packet to an MPLS packet VPN identification unit 129 identifies the VPN by referring to VPN label 156 of MPLS packet 154 and inputs the packet to the subrouter 123i (i=1, 2, ...) that corresponds to the VPN.

Subrouter 123i removes, where appropriate, forwarding label 158 and then refers to conversion table 124 to find the VID that corresponds to VPN label 156. Subrouter 123i then generates a VLAN packet 150 by adding a tag 152, which includes the VID found, in place of the VPN label 156 and sends VLAN packet 152 to VLAN 101-104, which is indicated by the VIED. It should be noted that the contents of table 124 is not the same in each MSPP 111-114 and that the VID values of VLANs that belong to the same VPN are not necessarily the same. Further, though not shown clearly in FIG. 2, a subrouter may exist for every VPN, as illustrated in FIG. 5.

Thus, for example, when communication is initiated from VLAN 101 of site A to VLAN 103 of site D in FIG. 1, tag 152 and label 156 are swapped by MSPP 111, 113 in the manner shown in FIG. 3. As a result, VLAN packet 150 that enters from VLAN 101 side is changed to an MPLS packet 154 by MSPP 111, MPLS packet 154 is transmitted through MPLS/SONET network 110 and is converted to a VLAN packet 150 by MSPP 113, and this VLAN packet is then transmitted to a VLAN 103 belonging to a VPN identical with that on the transmit side.

FIG. 5 illustrates one embodiment of Ethernet line card 121 of FIG. 2. In this embodiment, an Ethernet interface is provided for each Ethernet channel. The Ethernet line card 121 may be otherwise suitably configured in its functionality otherwise distributed or otherwise distributed or combined.

Referring to FIG. 5, Ethernet line card 121 includes a plurality of Ethernet channels associated with a plurality of VIDs. In this embodiment, each Ethernet channel is coupled to a corresponding VPN identification unit 122. For example, if the outgoing interface of the VPN table includes interface and subinterface information, a single Ethernet interface and VPN identification table 122 may be used at Ethernet line card 121.

In operation, an Ethernet channel is received by Ethernet line card 121. Ethernet line card 121 forwards each channel to a corresponding VPN unit 122. As previously described, the VPN identification unit 122 identifies a VPN by referring to the VID of the received VLAN packet and inputs the packet in the corresponding subrouter 123i for conversion. For egress traffic from MSPP 111, Ethernet line card 121 determines an outgoing interface (port) and sub-interface (channels) based on the outgoing interface identifier provided by the subrouter 123i.

Figure 6:
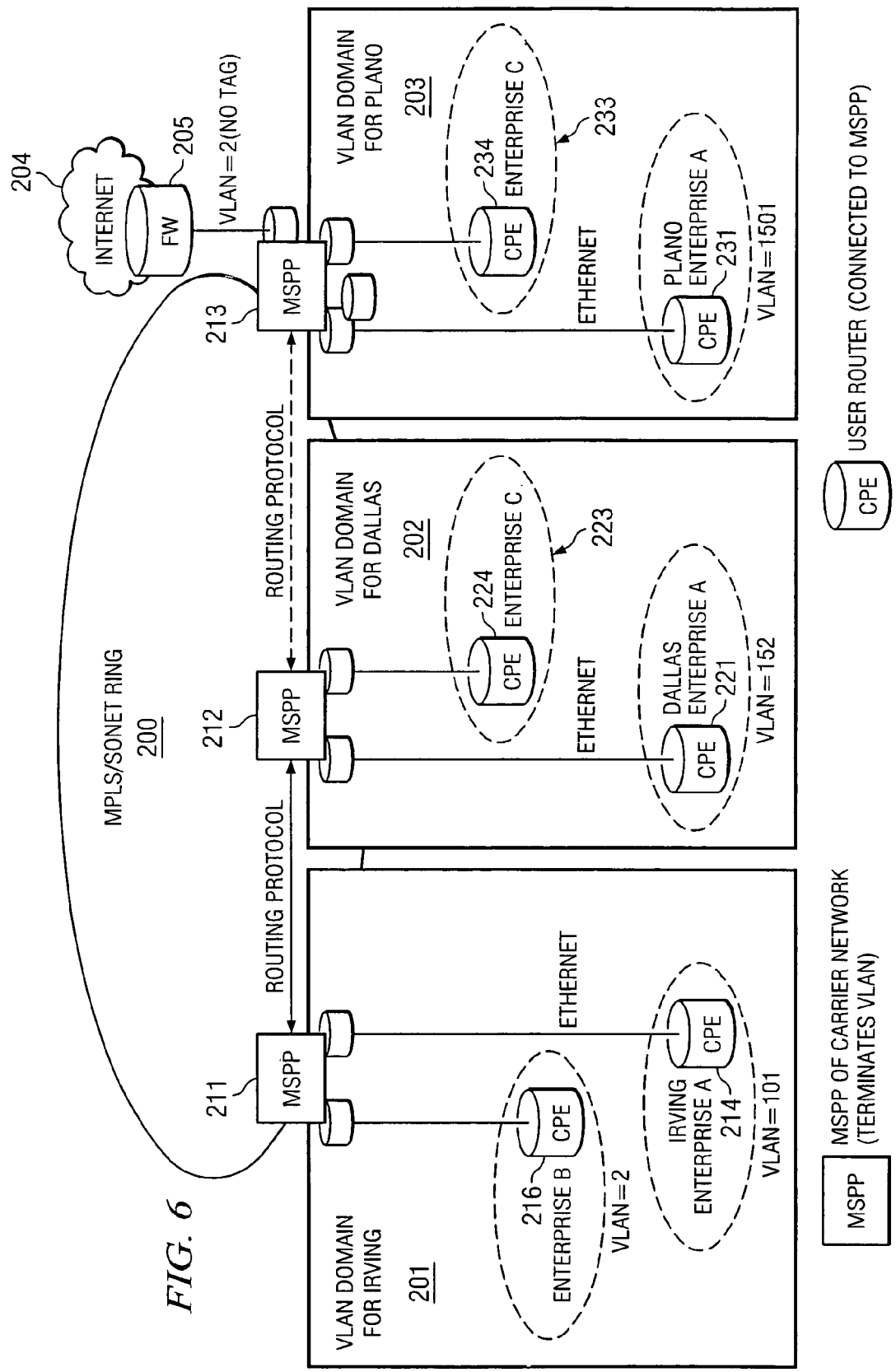
FIG. 6 illustrates one embodiment of the topology of enterprise networks utilizing a shared MPLS/SONET network.

FIG. 6 illustrates one embodiment of the topology of enterprise networks using a shared MPLS/SONET network. In this embodiment, MSPPs 211-213 are disposed between the VLANs and MPLS/SONET ring 200 to provide channelized EoS.

Referring to FIG. 6, an MPLS/SONET network 200 is formed as a dedicated or shared network. Numerals 201, 202 and 203 denote VLAN domains for Irving, Dallas and Plano, respectively. The VLAN domains may be for other cities, geographic regions, countries or states. For example, in one embodiment, the VLAN domains may comprise San Francisco, Los Angeles and San Diego. The Internet is indicated at 204 and a firewall (FW) as shown at 205. A plurality of enterprise VLANs have been set up at each of the VLAN domains. Provided between MPLS/SONET network 200 and the VLAN domains 201-203 at the edge of MPLS/SONET network are MSPPs 211-213, respectively, which terminate the respective VLANs. MSPPs in this embodiment support MPLS and SONET and are VPN aware.

A VLAN (VID=101) of an Enterprise A and a VLAN (VID=2) of an Enterprise B in the Irving area have been formed in the VLAN domain 201 for Irving. A CPE router (Customer Premises equipment Edge router) 214 constitutes part of the VLAN (VID=101) of Enterprise A is connected to a first port of MSPP 211. As previously described, MSPPs 211-213 provide mapping or adaptation of Ethernet interfaces to SONET paths. Accordingly, the CPEs in each VLAN domain 101-103 communicate with the MSPPs 211-213 by Ethernet and the MSPPs 211-213 communicate with MPLS/SONET network 200 via SONET channels. A CPE router 216 constitutes part of the VLAN (VID=2) of Enterprise B is connected to a second port of MSPP 211.

A VLAN (VID=152) of the Enterprise A and an Intranet of an Enterprise C in the Dallas area had been formed in the VLAN domain 202 for Dallas. A CPE router 221 constituting part of the VLAN (VID=152) of Enterprise A is connected to a first port of MSPP 212. A CPE router 224 constituting part of the Intranet of Enterprise C is connected to the second port of MSPP 212.

A VLAN (VID=1501) of the Enterprise A and an Intranet of the Enterprise C in the Plano area have been formed in the VLAN domain 203 for Plano. A CPE router 231 constituting part of the VLAN (VID=1501) of Enterprise A is connected by Ethernet to a first port of MSPP 213. A CPE router 234 constituting part of the Intranet of Enterprise C is connected to the second port of MSPP 213.

Figure 7A:
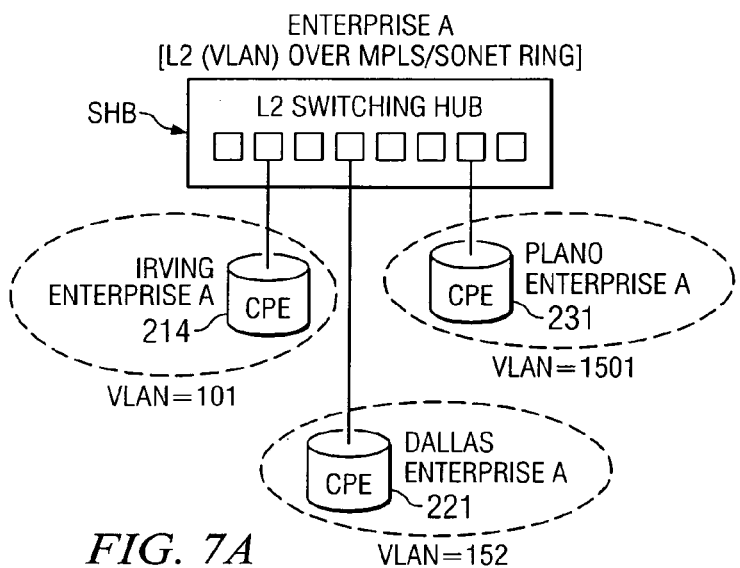
FIGS. 7A-C illustrates one embodiment of a logical view of the enterprise network of FIG. 6.
Figure 7B:
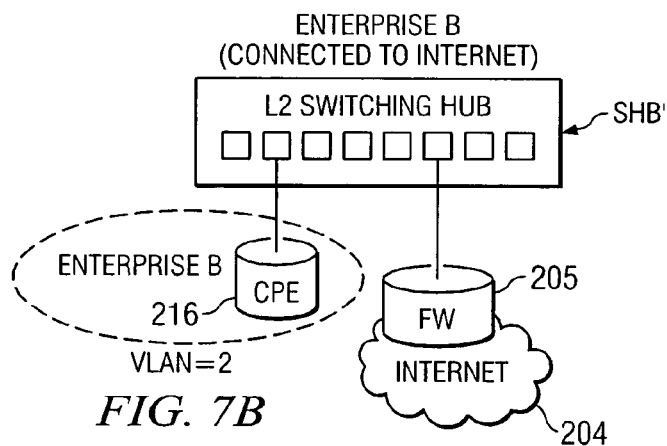
Figure 7C:
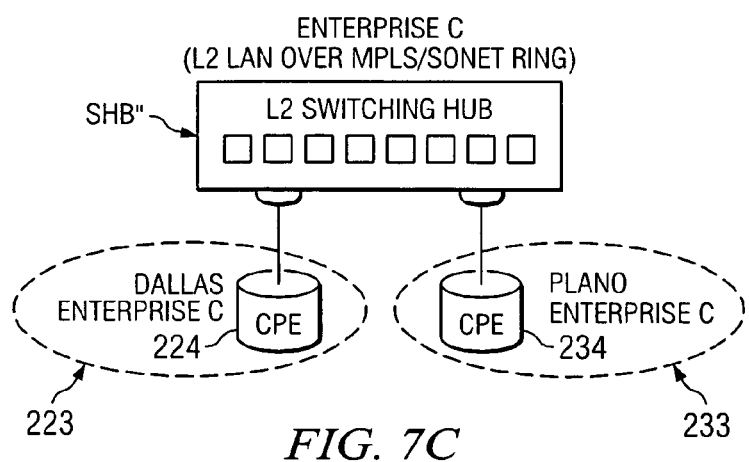

The VLAN (VID=101), VLAN (VID=152) and VLAN (VID=1501) of Enterprise A and the respective areas construct the same VPN. If MPLS/SONET network 200 is viewed from the side of Enterprise A, therefore, it appears as though CPE routers 214, 221, 231 have been connected to a Layer-2 switching hub SHB, as illustrated in FIG. 7A, and the network of Enterprise A takes on an emulated VLAN-over-MPLS/SONET network topology in which a core network is constructed by MPLS/SONET network 200 and an access network is constructed by the VLANs. If the side of MPLS/SONET network 200 is viewed from the side of Enterprise B, it appears as though the CPE router 216 and firewall 205 have been connected to a Layer-2 switching hub SHB', as illustrated in FIG. 7B, and the network of Enterprise B takes on the form of an Intranet connection. If the side of the MPLS/SONET network 200 is viewed from the side of Enterprise C, it appears as though CPE routers 224, 234 of the Intranets 223, 233, respectively, have been connected to a Layer-2 switching hub SHB", as illustrated in FIG. 7C, and the network of Enterprise C takes on the form of an emulated Ethernet LAN over MPLS/SONET network topology. For each enterprise, the MPLS/SONET ring appears as a Layer2 switching hub, not a switch/bridge or router.

Figure 8:
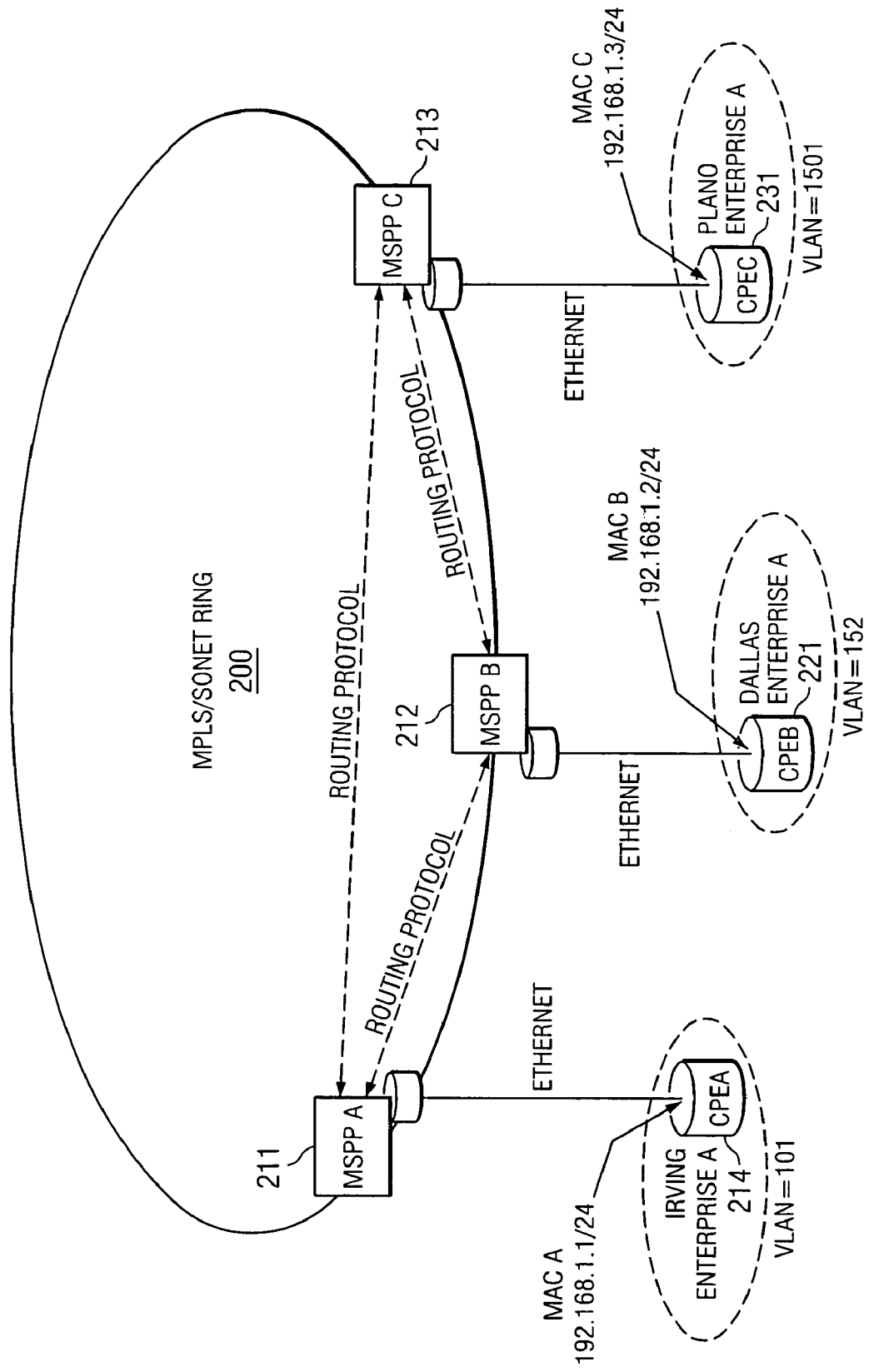
FIG. 8 illustrates one embodiment of the Layer-2 (L2) VPN for the Enterprise A of FIG. 6.

FIG. 8 illustrates one embodiment of the L2 VPN for the Enterprise A of FIG. 6. The components of Enterprise A are identical to those of FIG. 6 and are designated by like reference characters. Media Access Control (MAC) addresses MAC A, MAC B and MAC C which are L2 addresses, have been assigned to the routers CPE A 214, 221 and 231, respectively, that construct the VLANs.

Figure 9:
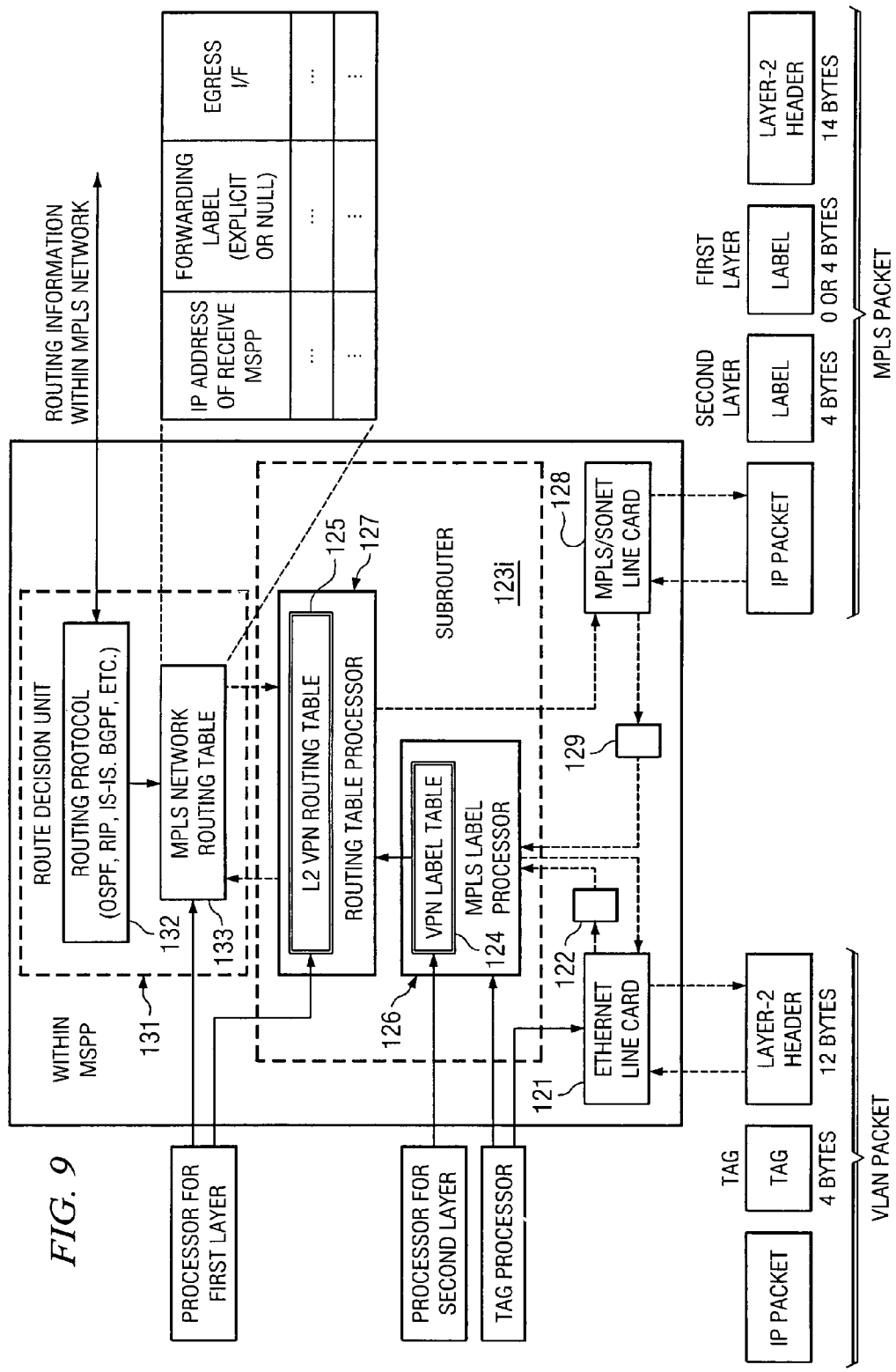
FIG. 9 illustrates one embodiment of the MSPP of FIG. 6.

FIG. 9 illustrates one embodiment of MSPP of FIG. 6. MSPPs 211-213 may be identical or similar to MSPP 111 of FIG. 2. Components in FIG. 9 that are identical to those of FIG. 2 are designated by like reference characters.

Ethernet line card 121, which has an Ethernet interface function, receives a VLAN packet from a prescribed VLAN. As previously described, the VLAN packet is received via Ethernet channels and forwarded to the corresponding VPN identification unit 122. The VPN identification unit 122 identifies the VPN by referring to the VID of the received VLAN packet and inputs the packet to the subrouter 123i that corresponds to this VPN. As shown in (a) of FIGS. 10A and 10B, the L2 label table 124 of the subrouter 123i stores, in one embodiment, the correspondence among (1) VPN labels (VPN identifiers), (2) L2 addresses (MAC addresses) of CPE routers under control, (3) output-side interfaces, (4) identifiers (VIDs) of VLANs connected to MSPPs, and (5) VPNi (VPN Instance): a convenient name for VPN identifier. The outgoing interface field may provide the interface and subinterface information for ports and channels for Ethernet channels.

FIG. 10A illustrates the initial state and FIG. 10B the state that results after various data have been set. For every VLAN construction the VPN, a L2 VPN routing table 125, in one embodiment, stores (1) a L2 address (MAC address) of the CPE router within a VLAN, (2) a loopback address (IP address) of the MSPP to which the CPE router is connected, and (3) an identifier (VID) of the VLAN to which the CPE router belongs, as shown in (B) of FIGS. 10A and 10B. In the example of FIG. 8, (1) MAC addresses MAC A, MAC B, MAC C of CPE routers 214, 221, and 231, respectively, (2) loopback address (IP addresses) of MSPPs (MSPP A, MSPP B, MSPP C) 211, 212, 213 to which the CPE routers are connected, and (3) VIDs (equal 101, 151, 1501) to which the CPE routers belong are stored in the table 125 in correspondence with the VLAN (VID=101), VLAN (VID=152) and VLAN (VID=1501), respectively, as shown in (B) of FIG. 10B.

The MPLS network routing table (forwarding-label memory) 133 stores forwarding labels which specify the route to the received MSPP 211-213 and egress interfaces. Using a routing protocol, the route decision unit for deciding the route within the MPLS/SONET network 200 searches for routes from the transmitting MSPP 211-213 to the receiving MSPP 211-213 to the receiving MSPP 211-213 and assigns a forwarding label and an egress interface to each route in accordance with the LDP (label distribution protocol) in such a manner that the VLANs belonging to the same VPN can communicate with one another Accordingly, route decision unit 131 decides the route to the receiving MSPP 211-213 using routing protocol 132 and stores forwarding label 158 (push label) and outgoing interface (which may include a physical interface and one or more SONET paths) in the forwarding label table 133 in a form mapped to the loopback address (IP address) of the receiving MSPP 211-213.

If a VLAN packet enters as an input, a VPN label processor 126 finds the VPN identifier (VPN label) 156, which corresponds to the VID contained in the tag, from the VPN label table 124. Further, on the basis of the destination MAC address containing the VPN packet 150, a routing table processor 127 obtains the loopback address of the output-side MSPP 211-213 from the L2 VPN routing table 125 and then finds the forwarding label and egress interface, which corresponds to the above mentioned loopback address (IP address), from the forwarding label table 133. If VPN label 156 and push label 158 have been found, subrouter 123i swaps VPN label 156 and forwarding label 158 for tag 152 to generate an MPLS packet 154, as shown in FIG. 3, and passes MPLS packet 154 to MPLS/SONET line card 128 to map MPLS packet 154 into one or more SONET paths. MPLS packet 154 arrives at the receiving MSPP 211-213 along the preset route through the MPLS/SONET network 200 while its forwarding label 158, if included, is replaced. MPLS/SONET line card 128 of the receiving MSPP 211-213 terminates the SONET path(s), receives the MPLS packet 154 from MPLS/SONET network 200, and passes a corresponding MPLS packet to VPN identification unit 129. VPN identification unit 129 identifies the VPN by referring to VPN label 156 of MPLS packet 154 and the SONET path(s) over which MPLS packet 154 was received and inputs packet 154 to the subrouter 123i (i=1, 2, . . . ) corresponding to the VPN. Subrouter 123i removes the forwarding label 158, if included, and refers to the VPN label table 124 to find the VID corresponding to VPN label 156. Subrouter 123i then swaps tag 152, which contains the VID, for VPN label 156 to thereby generate a VLAN packet 150 and sends this VLAN packet 150 via line card 121 to the VLAN indicated by the VID. It should be noted that the VPN label tables 124 and MSPPs 221-213 (FIG. 8) are not identical in content and that the VID values of VLANs that belong to the same VPN are not necessarily the same. Further, though not shown clearly in FIG. 9, subrouter 123i (i=1, 2, . . . ) and forwarding label table 123 may exist per every VPN.

In order to arrange it so that VLANs belonging to a VPN can communicate with each other, a route is established beforehand between MSPPs 211-213 to which these VLANs are connected to and forwarding labels and egress interfaces are stored in forwarding label table 133 (FIG. 9) of the router along the route, and the VPN label table 124 and L2 VPN routing table 125 are created.

In one embodiment, to create VPN label 124 and L2 VPN routing table 125, the operator may manually enter the VPN identifier (VPN label), the VLAN identifier (VID) and the VPNi, as illustrated at (A) in FIG. 10A. If these items of data are inputted into MSPPs 211-213, VPN label processor 126 of the MSPPs use the ARP (Address Resolution Protocol) to find the MAC address of the CPE router of the VLAN connected to this processor, finds the interface of the route over which the MPLS packet with the appended, where appropriate, push label are sent, such as shown in (A) of FIG. 10B and creates the VPN label table 124.

Next, routing table processor 127 finds the MAC address of the locally connected CPE router and the VLAN identifier (VID) from VPN label table 124 and creates direct-connect information of the L2 VPN routing table 125, which is illustrated, for example, in (B) of FIG. 10B. The MSPPs (MSPP A, MSPP B, MSPP C) 211, 212, 213 connected to the VLANs (VIDs=101, 152, 1501) that construct the VPN thereafter each send the other MSPPs 211-213 the MAC address of the locally connected user router CPE, the loopback address (IP address) of the locally connected MSPPs 211-213 and the VID by using a suitable routing protocol (e.g., OSPF, IS-IS, OSPF-TE). As a result, each MSPP 211-213 completes the fabrication of the L2 VPN routing table 125, as illustrated in (B) of FIG. 10B, based upon the received information, thus, L2 VPN routing tables 125 shown in FIGS. 11A-C are created in MSPPs 211, 212, 213 respectively, with regard to the VPN of Enterprise A in FIG. 8.

Figure 12:
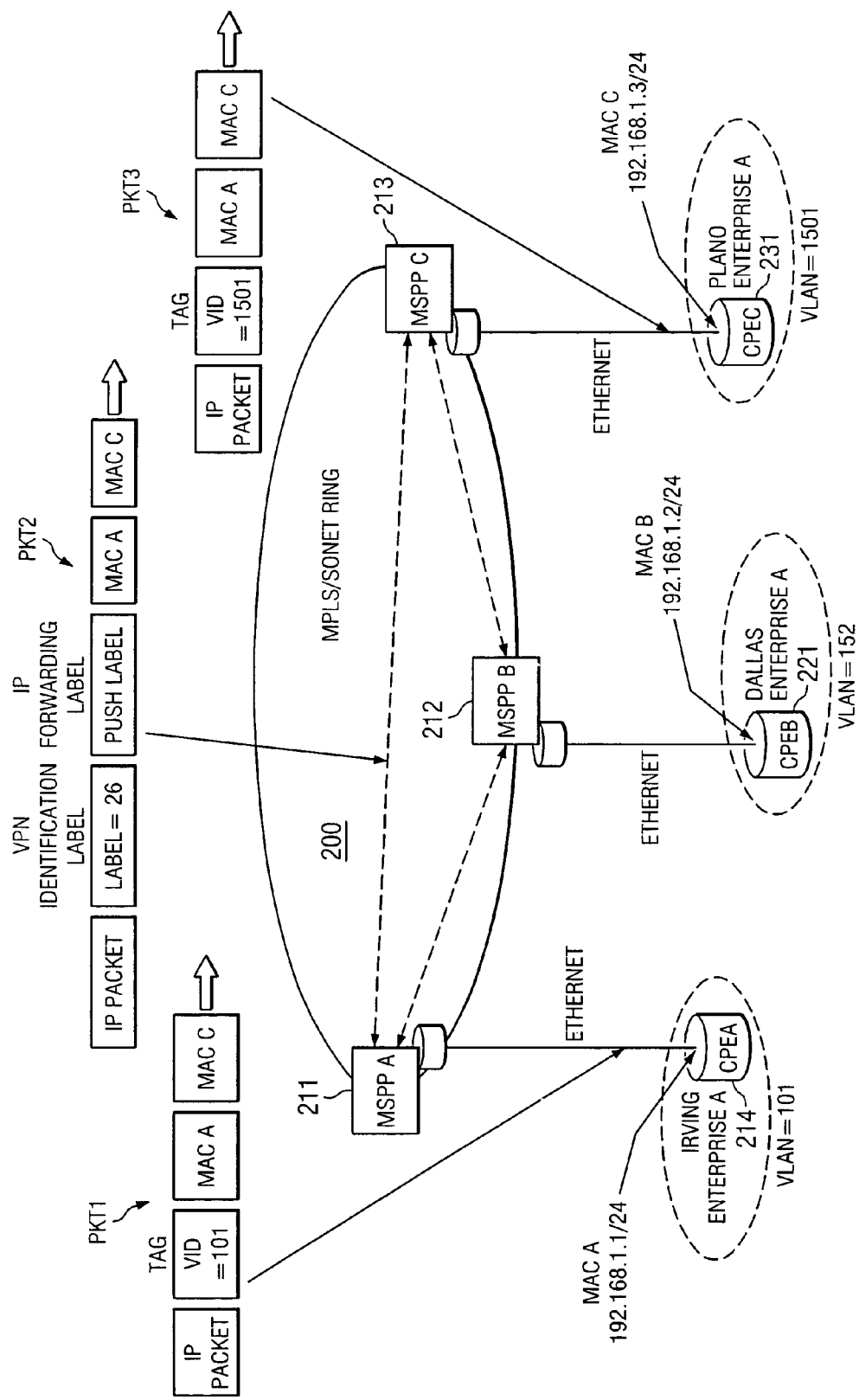
FIG. 12 illustrates exemplary transmission of a packet between customer premise equipment (CPEs) of disparate domains for Enterprise A of FIG. 6.

FIG. 12 illustrates exemplary transmissions of a packet between CPEs of disparate domains for Enterprise A of FIG. 6. In particular, FIG. 12 illustrates an example of transmission in which a packet is transmitted from the user router CPE A belonging to the VLAN (VID=101) of Enterprise A in Irving to the user router CPE C belonging to the VLAN (VID=1501) of Enterprise A in Plano.

User router CPE A 214 transmits a VLAN packet 150 (PKT1) that has been tagged with VID=101. When packet 150 (PKT1) enters MSPP A 211, the router generates an MPLS packet 154 (PKT2) by removing tag 152 and adding, in place of tag 152, a VPN label 156 (26: the VPN identifier of Enterprise A) and a forwarding label 158 (push label), where appropriate, and sends MPLS packet 154 (PKT2) to MPLS/SONET network 200 over a SONET path. MPLS packet 154 (PKT2) subsequently arrives at the receiving MSPP C 213 along the preset route through MPLS/SONET network 200 while its forwarding label 158, if included, is replaced. The receiving MSPP C 213 creates a VLAN packet 150 (PKT3) by removing labels 154 and adding a VLAN identifier (VID=1501) to which destination user router CPE C belongs and then sends this packet to the VLAN specified by VID=1501. As a result, VLAN packet 150 (PKT3) arrives at the user router 231.

Figure 13:
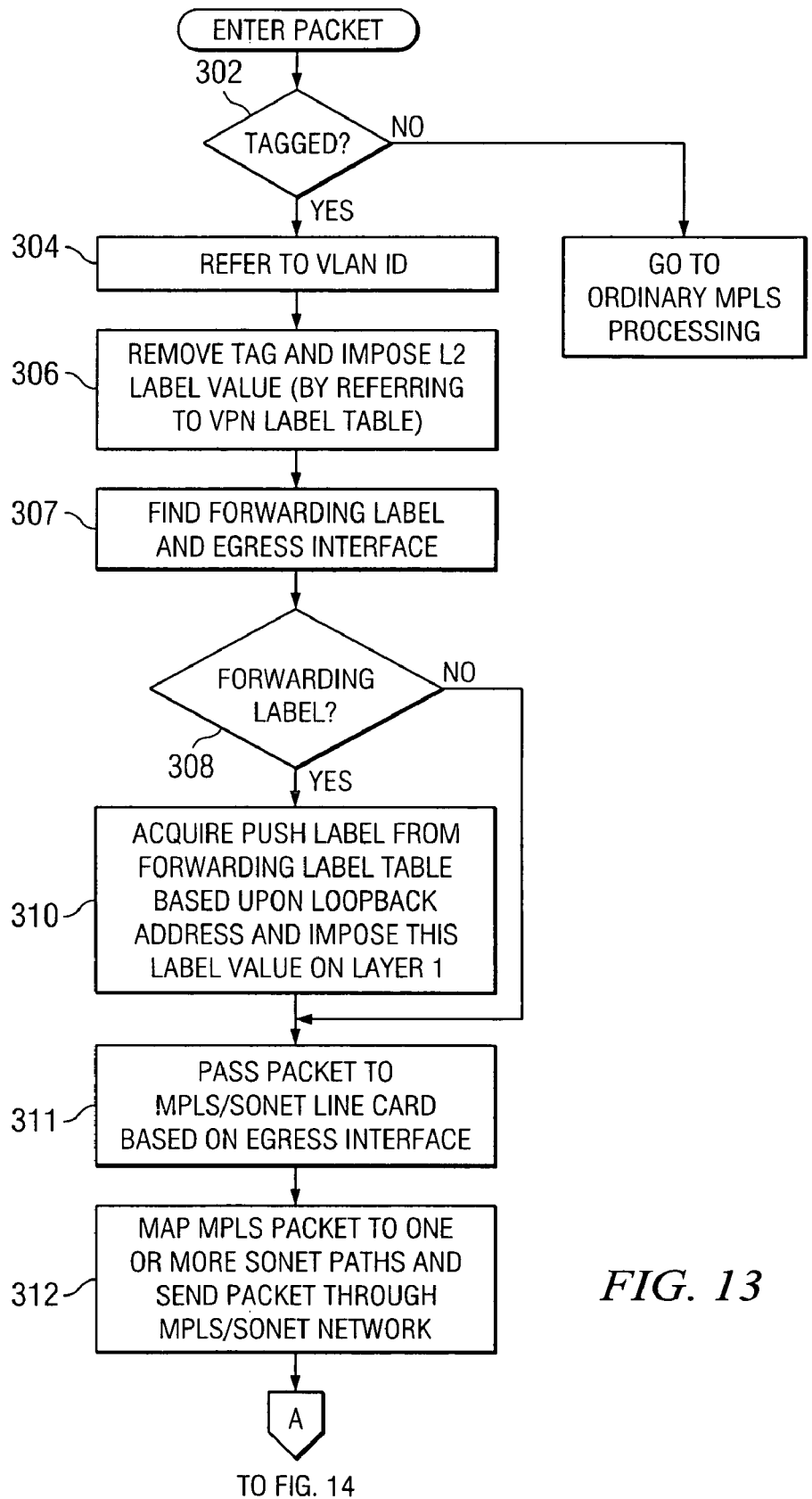
FIG. 13 illustrates one embodiment of a first part of a method for VLAN-mapped MPLS/SONET transmit processing.
Figure 14:
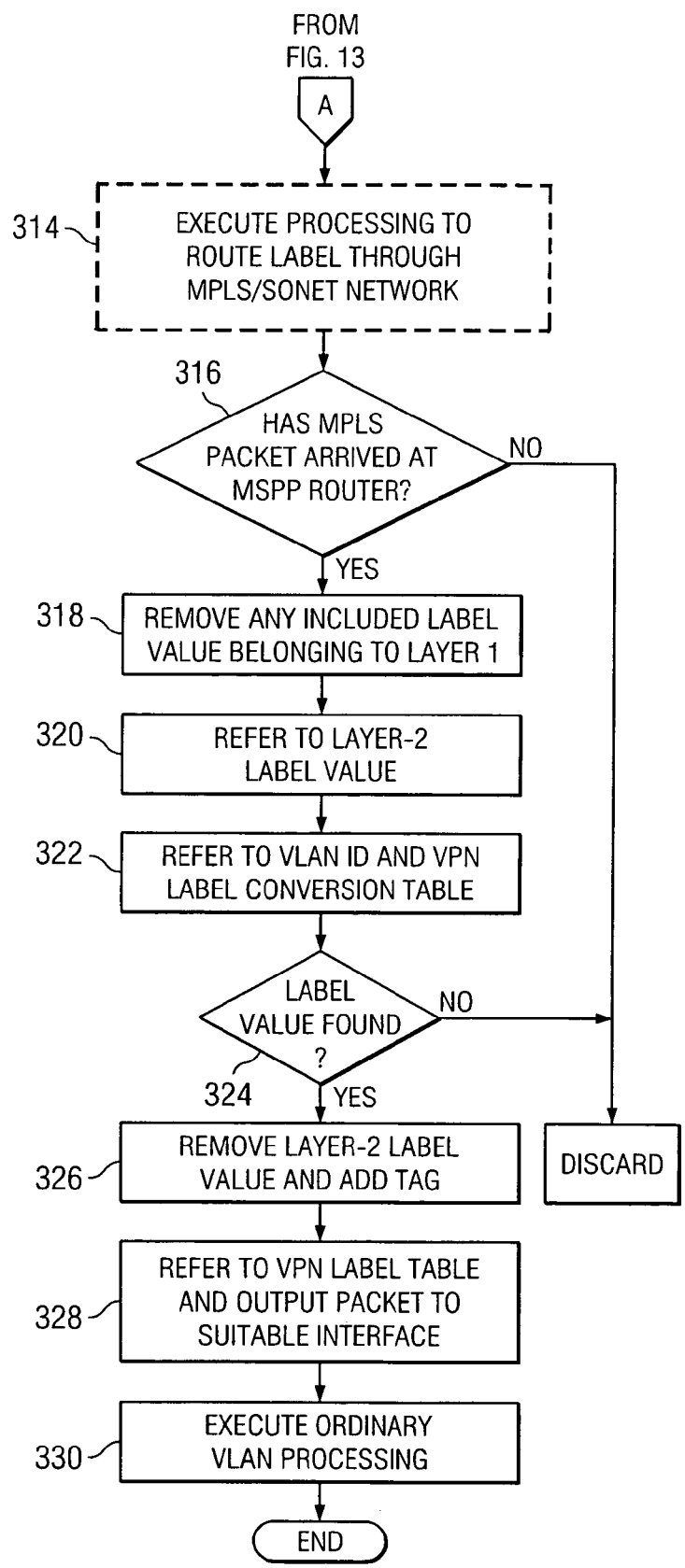
FIG. 14 illustrates one embodiment of a second part of the method for VLAN-mapped MPLS/SONET transmit processing.

FIGS. 13-14 illustrate one embodiment of the method for VLAN-mapped MPLS/SONET transmit processing. In this embodiment, VLAN packets 150 are received via Ethernet channels and transmitted as MPLS packets.

Referring to FIGS. 13-14, when a packet arrives as an input, the transmitting MSPP 211-13 checks to determine whether the packet has been tagged at step 301. If it has not been tagged, MSPP 211-213 executes ordinary MPLS processing. If the packet has been tagged, MSPP 211-213 extracts the value of the VLAN ID (=VID) contained in tag 152 at step 302. Next, at step 306, the MSPP removes tag 152 and imposes a L2 label value (VPN label) 156.

If a forwarding label is required at step 308, then the execution proceeds to step 310. At step 310, MSPP 211-213 refers to forwarding label table 133 to find the forwarding label (push label) and imposes the push label as L1 and into one or more SONET paths. If the forwarding label is not required, then execution proceeds to step 311. At step 311, the MPLS packet is passed to an MPLS/SONET line card based on the retrieved egress interface. At step 312, the packet is sent to MPLS/SONET line card 128 to map the MPLS packet 154 to one or more SONET paths and send the MPLS packet through MPLS/SONET network 200.

The above is the processing executed by MSPP 211-213 on the transmitting side. This is followed by execution of processing for routing MPLS packet 154 through MPLS/SONET network 200. MPLS packet 154 is forwarded to the target MSPP 211-213, along the set route through MPLS/SONET network 200 while forwarding label 158, if included, is replaced at step 314.

The receiving MSPP 211-213 checks to see whether MPLS packet 154 has arrived at decisional step 316. If MPLS packet 154 has arrived, MSPP 211-213 removes any included forwarding label 158 attached as L1 at step 318. Next, MSPP 211-213 extracts the L2 VPN label 156 at step 320, refers to table 124 indicating the correspondence between the VLAN ID (=VID) and VPN label at step 322 and checks to see whether the VID has been found at step 324. If the VID has not been found, MSPP 211-213 discards packet 154. If the VID has been found, however, MSPP 211-213 removes L2 label 156 and adds a tag 152 that contains the VID to create a VLAN packet at step 326. Next, MSPP 211-213 refers to VPN label table 124 to find the output interface and sends VLAN packet 152 to that interface at step 317. As previously described, the output interface may be a logical Ethernet destination at Ethernet line card 121. In this embodiment, at Ethernet line card 121, the logical Ethernet value may be mapped to an interface and sub-interface identifying port and channels. The destination user router CPE C receives the VLAN packet and executes predetermined processing at step 330.

Figure 15A:
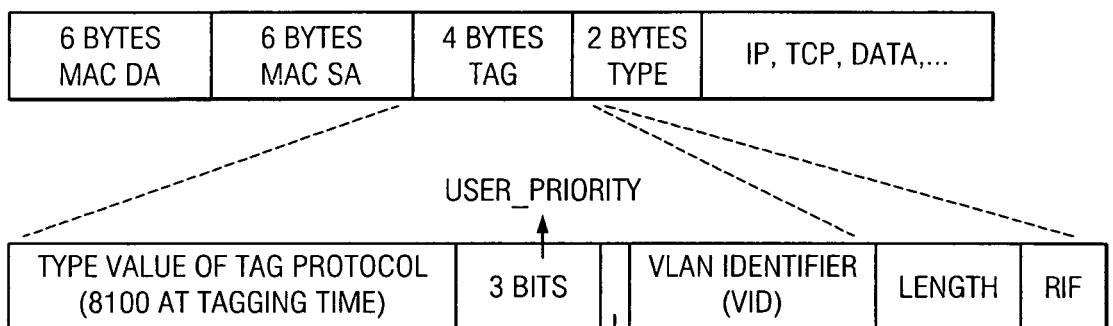
FIGS. 15A-B illustrate one embodiment of correspondence between user priority and a VLAN and IP precedence and MPLS/SONET.
Figure 15B:
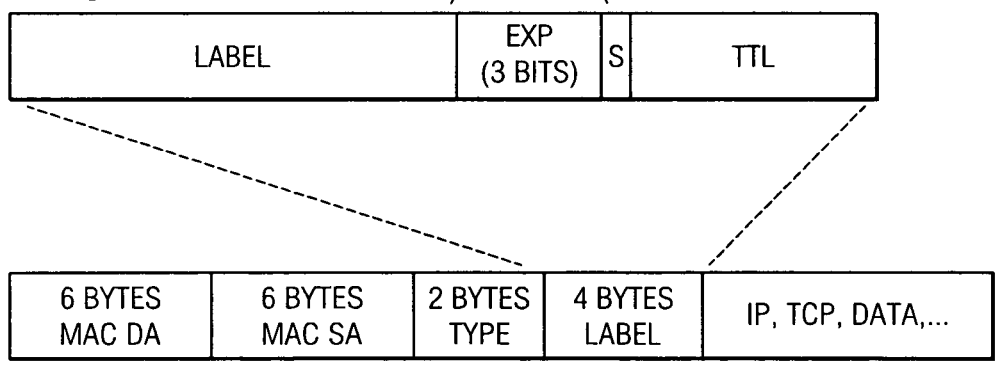

FIGS. 15A-B illustrate one embodiment of correspondence between user priority and a VLAN and IP precedence and MPLS. Referring to FIG. 17A, tag 152 of a VLAN packet 150 includes three-bit user priority and it is arranged so that the priority value stipulated by each MAC is entered using these three bits. A priority value can take on eight values of 0-7. User priority is low if the value is small (e.g., zero) and high if the value is large.

The label of an MPLS packet 154, on the other hand, includes a three-bit experimental field EXP, as shown in FIG. 17B. IP precedence is expressed using these three bits. IP precedence also is a priority value that can take on eight levels of 0-7. Priority is low if the value is small (e.g., zero) and high if the value is large. Accordingly, when a conversion is made from a VLAN packet 150 to an MPLS packet 154 in an MSPP 211-213, the three-bit user priority is inserted into the EXP field. When a conversion is made from an MPLS packet 154 to a VLAN packet 150, the IP precedence of the three-bit EXP field is inserted into the user-priority field. Thus, in one embodiment, priority control in a VLAN can be continued as IP precedence control in an MPLS network. Further, it is possible to return from IP precedence control to the original priority control in a VLAN.

Although the present invention has been described in detail, various changes and modifications may be suggested to one skilled in the art. It is intended that the present invention encompass such changes and modifications as falling within the scope of the appended claims.

What is claimed:

1. A virtual private network (VPN), comprising:
   a core network, the core network comprising Multiprotocol Label Switching (MPLS) network over SONET;
   a plurality of Virtual Local Access Networks (VLANs), each coupled to a Multiservice Provision Platform (MSPP) of the SONET network, the VLANs each communicating traffic with a corresponding MSPP utilizing Ethernet; and
   the MSPPs interfacing the VLANs with the SONET network, the MSPPs each operable to:
      convert an ingress VLAN packet received from a VLAN and associated with a VPN to an MPLS packet and send the MPLS packet to the SONET network over one or more SONET paths, wherein converting an ingress VLAN packet to an MPLS packet comprises identifying a VPN label that corresponds to a VLAN identifier (VID) of the ingress VLAN packet and generating an MPLS packet having the VPN label; and
      convert an MPLS packet received from the SONET network to an egress VLAN packet and send the egress packet to a VLAN associated with the VPN, wherein converting an MPLS packet to an egress VLAN packet comprises identifying a VID that corresponds to a VPN label contained in the received MPLS packet and generating a VLAN packet having the VID.

2. The VPN of claim 1, the MSPPs each comprising a first table storing correspondence between VLAN identifiers (VIDs) contained in VLAN packets and VPN labels contained in MPLS packets.

3. The VPN network of claim 1, wherein each MSPP comprises:
   a route decision unit for determining an outgoing interface which directs an MPLS over SONET packet to an egress MSPP operable to receive egress traffic exiting the core network; and
   a second table for storing outgoing interfaces, mapped to addresses of egress MSPPs.

4. The VPN of claim 3, wherein an MSPP transmitting ingress traffic entering the core network is operable to determine an outgoing interface, which corresponds to the egress MSPP, from the second table, generates an MPLS packet that contains the VPN label and sends the MPLS packet over one or more SONET paths in the SONET network.

5. The VPN network of claim 3, wherein the egress interface comprises a physical interface and a SONET path.

6. The VPN of claim 3, wherein the route decision unit further determines a forwarding label.

7. The VPN of claim 1, wherein at least one MSPP comprises a half bridge operable to only replicate traffic entering the core network, only learns Layer-2 address information from the core network, and performs split horizon forwarding.

8. The VPN of claim 1, the core network operable to pass Ethernet control traffic transparently.

9. The VPN of claim 1, wherein the core network does not participate in a Ethernet switch control plane.

10. An A Multiservice Provisioning Platform (MSPP) of a shared label switching over SONET network, comprising:
   an Ethernet line card operable to receive from a Virtual Local Access Network (VLAN) a VLAN packet and to send the VLAN packet received to a corresponding Ethernet interface;
   one or more VPN units coupled to the Ethernet interface and operable to identify a VPN for the VLAN packet and to send the VLAN packet to a corresponding VPN subrouter based on the VPN;
   each VPN subrouter operable to convert the VLAN packet to a label switching packet and to send the label switching packet to a corresponding label switching over SONET line card, wherein converting a VLAN packet to a label switching packet comprises identifying a VPN label that corresponds to a VLAN identifier (VID) of the VLAN packet and generating a label switching packet having the VPN label and a forwarding label; and
   a label switching over SONET line card operable to receive the label switching packet and map the label switching packet into one or more SONET paths for transmission over the shared label switching over SONET network.

11. The MSPP of claim 10, wherein the label switching over SONET network comprises a Multi Protocol Label Switching (MPLS) network.

12. The MSPP of claim 10 wherein each VPN subrouter is further operable to convert the VLAN packet to the label switching packet by inserting user priority information from the tag of the VLAN packet into a label of the label switching packet.

13. A method, comprising:
   receiving ingress Ethernet packets associated with one or more Virtual Private Networks (VPNs);
   determining a VPN associated with each ingress Ethernet packet;
   converting each ingress Ethernet packet to a shared switching packet based on the associated VPN for transmission over a shared network, wherein converting an ingress Ethernet packet to a shared switching packet comprises identifying a VPN label that corresponds to a VLAN identifier (VID) of the ingress Ethernet packet and generating a shared switching packet having the VPN label and a forwarding label;
   determining an egress interface for the Ethernet packet; and
   converting the shared switching packet into one or more SONET paths based on the egress interface.

14. The method of claim 13, wherein the shared switching packet comprises a Multi Protocol Label Switching (MPLS) packet.

15. The method of claim 13, wherein the egress interface comprises a SONET path and an outgoing interface.

16. A method, comprising:
   receiving an Ethernet packet associated with one or more Virtual Private Networks (VPNs);
   determining a VPN associated with the Ethernet packet;
   converting the Ethernet packet to an MPLS packet based on the associated VPN for transmission over a MPLS/SONET network, wherein converting an Ethernet packet to a MPLS packet comprises identifying a VPN label that corresponds to a VLAN identifier (VID) of the VLAN packet;
   determining a forwarding label, at least one SONET path, and outgoing interface for the Ethernet packet;
   forwarding the MPLS packet to a MPLS/SONET line card based on the outgoing interface; and
   converting the MPLS packet into a SONET frame based on the at least one SONET path.

* * * * *